(12) United States Patent  
Wu et al.

(10) Patent No.: US 8,520,912 B2
(45) Date of Patent: Aug. 27, 2013

(54) FINGERPRINT RECOGNITION DEVICE

(75) Inventors: Chien-Hsing Wu, Kaohsiung (TW); Jung-Tsung Chou, Hsinchu County (TW)

(73) Assignee: Gingy Technology Inc., Hsinchu (TW)

( * ) Notice: Subject to any disclaimer, the term of this patent is extended or adjusted under 35 U.S.C. 154(b) by 21 days.

(21) Appl. No.: 13/314,624

(22) Filed: Dec. 8, 2011

(65) Prior Publication Data

US 2012/0328170 A1    Dec. 27, 2012

(30) Foreign Application Priority Data

Jun. 24, 2011  (TW) .............................. 100122305 A

(51) Int. Cl.
*G06K 9/00*    (2006.01)
(52) U.S. Cl.
USPC ............................ 382/124; 382/125; 382/115
(58) Field of Classification Search
USPC .......................................... 382/124, 125, 115
See application file for complete search history.

(56) References Cited

U.S. PATENT DOCUMENTS

| | | | | |
|---|---|---|---|---|
| 3,716,301 A * | 2/1973 | Caulfield et al. | ............... | 356/394 |
| 4,227,805 A * | 10/1980 | Schiller | ........................... | 356/71 |
| 5,732,148 A * | 3/1998 | Keagy et al. | ................... | 382/124 |
| 5,974,162 A * | 10/1999 | Metz et al. | ...................... | 382/124 |
| 7,148,466 B2 * | 12/2006 | Eckman et al. | ............... | 250/221 |
| 7,706,582 B2 * | 4/2010 | Nagasaka et al. | ............. | 382/124 |
| 2002/0131624 A1 * | 9/2002 | Shapiro et al. | ................ | 382/124 |
| 2002/0150284 A1 * | 10/2002 | Iwai | .............................. | 382/124 |
| 2003/0118219 A1 * | 6/2003 | Higuchi et al. | ............... | 382/125 |
| 2004/0240713 A1 * | 12/2004 | Hata | ............................. | 382/124 |
| 2005/0254690 A1 * | 11/2005 | Nagasaka et al. | ............. | 382/115 |
| 2006/0177106 A1 * | 8/2006 | Wrage | .......................... | 382/115 |

* cited by examiner

*Primary Examiner* — Vu Le
*Assistant Examiner* — Aklilu Woldemariam
(74) *Attorney, Agent, or Firm* — Morris Manning & Martin LLP; Tim Tingkang Xia, Esq.

(57) ABSTRACT

A fingerprint recognition device, applicable to retrieving a fingerprint image, includes a light guiding plate, a finger plate, an imaging piece, and at least one light source. The light guiding plate has a first surface and a second surface opposite to each other and a sidewall surface connected between the first surface and the second surface. The finger plate is adjacent to the first surface of the light guiding plate. The imaging piece is adjacent to the second surface of the light guiding plate, and the light source is adjacent to the sidewall surface of the light guiding plate. The light source emits a light towards the sidewall surface and the light enters the light guiding plate. The light guided by the light guiding plate is emitted out of the first surface, and the imaging piece retrieves the fingerprint image on the finger plate.

10 Claims, 4 Drawing Sheets

FINGERPRINT RECOGNITION DEVICE

CROSS-REFERENCE TO RELATED APPLICATIONS

This non-provisional application claims priority under 35 U.S.C. §119(a) on Patent Application No(s). 100122305 filed in Taiwan, R.O.C. on Jun. 24, 2011, the entire contents of which are hereby incorporated by reference.

BACKGROUND

1. Technical Field

The present disclosure relates to a recognition device, and more particularly to a fingerprint recognition device.

2. Related Art

With the development of multimedia technologies, more and more portable electronic devices, such as a mobile phone, a Personal Digital Assistant (PDA), a digital camera, and a personal notebook computer, are becoming essential tools in people's lives. However, the portable electronic devices are very personalized and contain lots of private information. Therefore, once the portable electronic devices are lost or stolen, information such as the contact information, photos and data stored inside the portable electronic devices may be obtained by other people, causing unnecessary problems and losses.

Therefore, this type of products need identity (ID) authentication and license management to ensure privacy and security of a user. A main ID authentication method adopted currently is password protection, in which a user at first needs to input a correct password into the portable electronic device before the portable electronic device enters a control menu. However, the password protection is not very secure because the password can be easily leaked or cracked. It is also very troublesome if the user forgets the password. Therefore, a portable electronic device having ID authentication adopting fingerprint recognition becomes available in the market. As all people have different fingerprints, the security of the ID authentication adopting the fingerprint recognition is improved greatly. Moreover, the ID authentication method adopting the fingerprint recognition is convenient that the user does not need to remember the password.

A conventional fingerprint recognition device has a direct-type light source design, in which a diffusion plate is disposed below a finger plate. A number of light sources and an imaging device are disposed at the bottom of the diffusion plate. The light emitted from the light source is diffused through the diffusion plate and then enters the surface of the finger plate, and the fingerprint image of the finger on the finger plate is reflected by the the finger plate and then received by the imaging device. The fingerprint recognition device having the direct-type light source design requires a thicker buffer space to achieve the light diffusion effect, so the thickness of the fingerprint recognition device has to be increased. Moreover, the fingerprint recognition device having the direct-type light source design also requires more light sources to be disposed in a whole area at the bottom of the diffusion plate. In this way, not only the light source cost is increased, but also a bright point phenomenon may occur easily, thereby affecting the imaging quality.

SUMMARY

The present disclosure is a fingerprint recognition device, which solves the problem of a fingerprint recognition device occupying a large volume that prevents mobile phones from becoming thinner and thinner in the development.

A fingerprint recognition device according to the present disclosure, applicable to obtaining a fingerprint image of a finger, comprises a light guiding plate, a finger plate, an imaging piece, and at least one light source. The light guiding plate has a first surface, a second surface, and at least one sidewall surface. The first surface and the second surface are located at two opposite sides of the light guiding plate respectively, and the sidewall surface is connected between the first surface and the second surface. The second surface further has a reflection structure or a scattering structure. The finger plate is adjacent to the first surface of the light guiding plate, and the imaging piece is adjacent to the second surface of the light guiding plate. The light source is adjacent to the sidewall surface of the light guiding plate and emits a light towards the sidewall surface entering the light guiding plate. The light guided by the reflection structure or the scattering structure is emitted from the first surface, so that the light guiding plate forms a back light source of the finger plate, and the imaging piece retrieves the fingerprint image of the finger on the finger plate.

Through the fingerprint recognition device according to the present disclosure, the light source is disposed at the sidewall surface of the light guiding plate, so that the whole thickness of the fingerprint recognition device is not increased. Moreover, the light source irradiates at the side of the light guiding plate to function as the surface light source, which not only solves the bright point problem but also reduces the number of the light sources and improve the quality of fingerprint contrast.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1A:
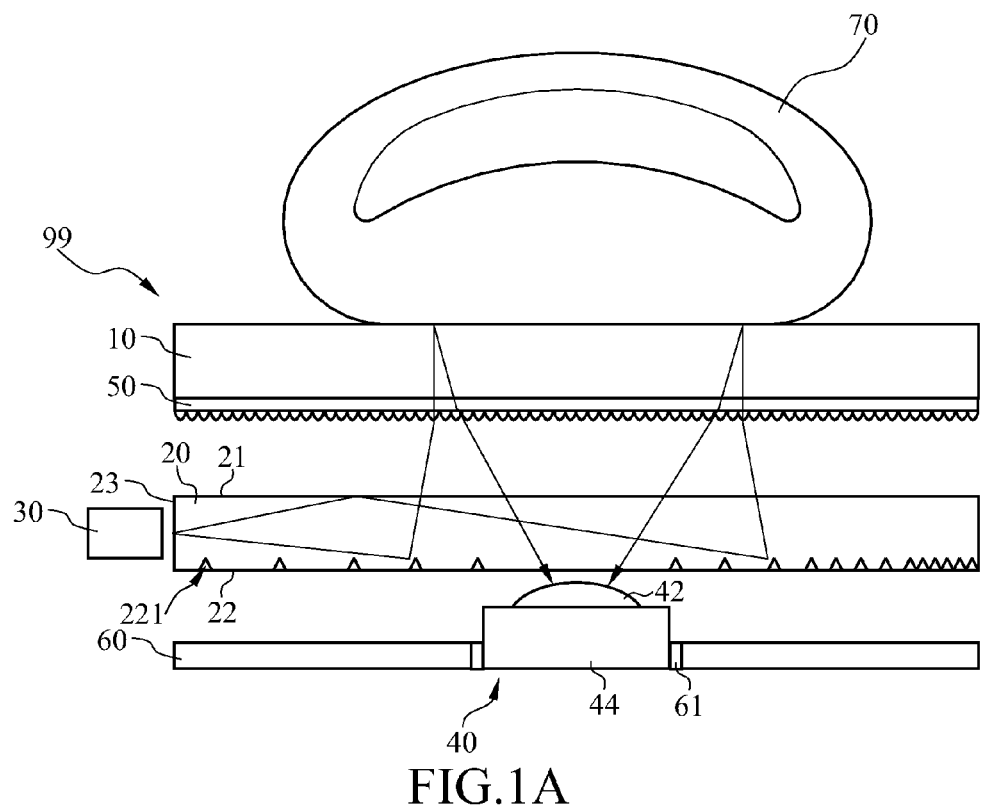
FIG. 1A is a structural sectional view of a fingerprint recognition device according to an embodiment.
Figure 1B:
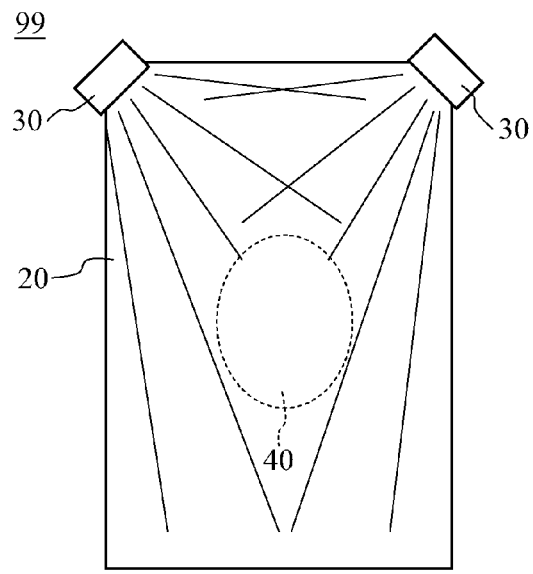
FIG. 1B is a schematic view of light source distribution according to an embodiment.

FIG. 1A is a structural sectional view of a fingerprint recognition device according to an embodiment. FIG. 1B is a schematic view of light source distribution according to an embodiment.

Referring to FIG. 1A and FIG. 1B, the fingerprint recognition device 99 in this embodiment is used for obtaining a fingerprint image on a finger 70 to interpret an ID of the obtained fingerprint image. The fingerprint recognition device 99 comprises a finger plate 10, a light guiding plate 20, at least one light source 30 and an imaging piece 40. The light guiding plate 20 is a transparent sheet. The material of the light guiding plate 20 may be glass, Polymethyl Methacrylate (PMMA) (commonly referred to as acrylic), or Polycarbonate (PC), but the present disclosure is not limited thereto. The light guiding plate 20 has a first surface 21, a second surface 22 and at least one sidewall surface 23. The first surface 21 and the second surface 22 are located at two opposite sides of the light guiding plate 20 respectively, and the sidewall surface 23 is connected between the first surface 21 and the second surface 22. Moreover, the second surface 22 further has a reflection structure or a scattering structure. In this embodiment, the second surface 22 has the reflection structure. The reflection structure includes a number of tiny pits 221, and the pits 221 are concave on the second surface 22. The pit 221 may be a cone, a column or a polyhedron, but the present disclosure is not limited thereto.

The finger plate 10 in this embodiment is a light transmitting plate. The material of the finger plate 10 may be glass, PMMA or PC, but the present disclosure is not limited thereto. The finger plate 10 is used for being pressed by the finger 70 to assist the imaging piece 40 in obtaining the fingerprint image. The finger plate 10 is adjacent to the first surface 21 of the light guiding plate 20. Furthermore, the finger plate 10 is disposed over the light guiding plate 20. The first surface 21 of the light guiding plate 20 faces the finger plate 10, and there is a distance between the light guiding plate 20 and the finger plate 10. The distance between the light guiding plate 20 and the finger plate 10 is not intended to limit this embodiment. In another embodiment, the finger plate 10 and the light guiding plate 20 may be attached to each other, which means that the finger plate 10 may be directly adhered on the first surface 21 of the light guiding plate 20.

The imaging piece 40 in this embodiment is adjacent to the second surface 22 of the light guiding plate 20. The imaging piece 40 may be a Charge Coupled Device (CCD), a Complementary Metal Oxide Semiconductor (CMOS) device, or a Contact Image Sensor (CIS), but the present disclosure is not limited thereto.

The imaging piece 40 comprises a lens 42 and a sensor 44. The lens 42 faces the second surface 22 and is used for obtaining the fingerprint image on the finger 70. The sensor 44 converts the fingerprint image into an electrical signal.

Figure 2A:
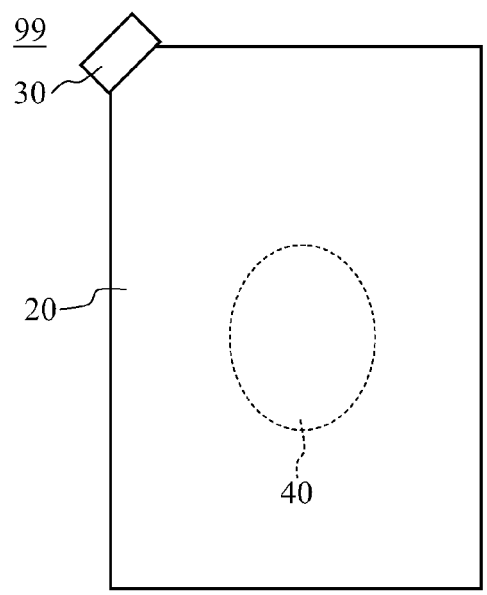
FIG. 2A to FIG. 2C are schematic views of light source distribution according to other embodiments.
Figure 2B:
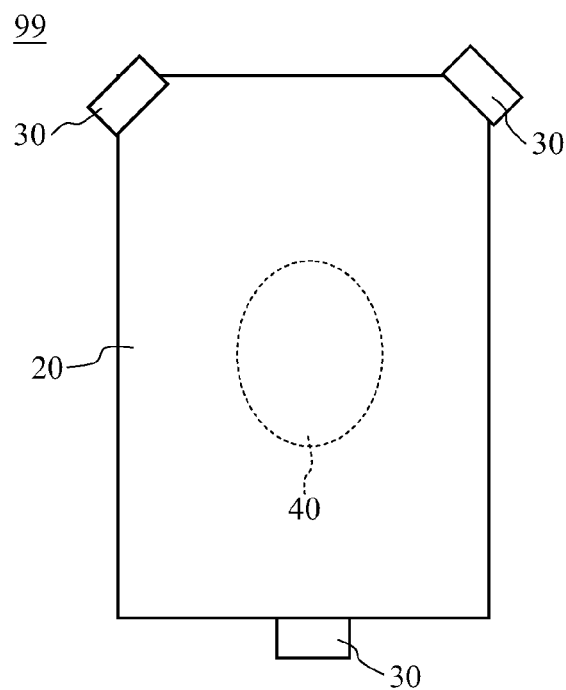
Figure 2C:
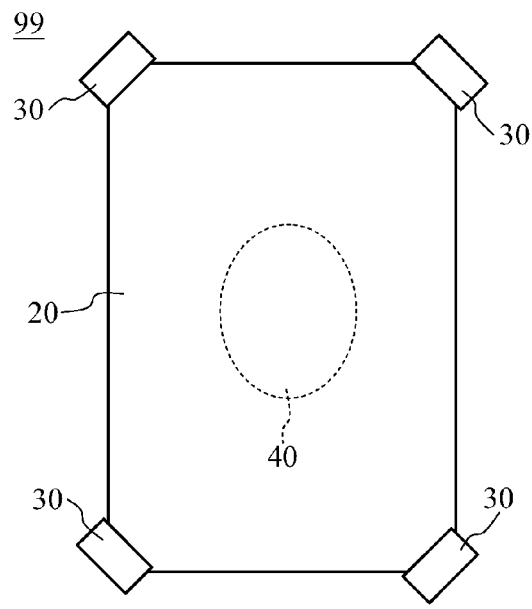

The light source 30 is adjacent to the sidewall surface 23 of the light guiding plate 20. Particularly in this embodiment having two light sources 30, the light guiding plate 20 is generally a rectangular plate body with four corners. The two light sources 30 are disposed at two adjacent corners of the light guiding plate 20 respectively and correspond to the sidewall surface 23 at the two corners. However, the number of the light sources 30 and relative placement positions of the light sources 30 and the light guiding plate 20 are only taken for example, but the present disclosure is not limited thereto as long as the light source 30 may irradiate towards the sidewall surface 23. One example in another embodiment, as shown in FIG. 2A, may have only one light source 30, and the light source 30 is disposed at one of the corners of the light guiding plate 20 and corresponds to the sidewall surface 23 at the corner. Alternatively, in another embodiment, the number of light sources 30 may be three. Two of the three light sources 30 are disposed at two adjacent corners of the light guiding plate 20 and the other one of the three light sources 30 is disposed at the opposite side of the two corners respectively, as shown in FIG. 2B. Alternatively, in another embodiment, the number of light sources 30 may be four, and the four light sources 30 are respectively disposed at the four corners of the light guiding plate 20 respectively, as shown in FIG. 2C.

The light source 30 may be a light-emitting diode (LED), but the present disclosure is not limited thereto. The light source 30 emits a light towards the sidewall surface 23 and the light enters the light guiding plate 20. The pits 221 on the second surface 22 of the light guiding plate 20 reflect the light, and the reflected light is sended out of the light guiding plate 20 from the first surface 21, so that the first surface 21 of the light guiding plate 20 forms a evenly distributed surface light source generating evenly distributed surface light entering the finger plate 10. In this way, the surface light source formed by the first surface 21 may be used as a back light source of the finger plate 10.

It should be noted that, an arrangement density of the reflection structure or the scattering structure depends on a disposed position of the light source 30. A distribution density of the reflection structure or the scattering structure in the area far away from the light source 30 is greater than the distribution density of the reflection structure or the scattering structure in the area adjacent to the light source 30. For example, the distribution density of the pits 221 on the second surface 22 ascends in a direction away from the light source 30. In this way, the light emitted from the first surface 21 is distributed evenly to provide a light diffusion effect for the finger plate 10. Moreover, the reflection structure or the scattering structure on the second surface 22 and the lens 42 are misaligned with each other. In other words, the arrangement position of the reflection structure or the scattering structure on the second surface 22 of the light guiding plate 20 and an image retrieving position of the imaging piece 40 facing the light guiding plate 20 are misaligned with each other. That is, the second surface 22 of the light guiding plate 20 has the reflection structure or the scattering structure, but a partial area of the second surface 22 is not disposed with the reflection structure or the scattering structure so that the partial area of the second surface 22 is flat. Also, the lens 42 corresponds to the flat surface so that an image retrieving area of the lens 42 facing the light guiding plate 20 and the reflection structure or the scattering structure are misaligned with each other. In this way, it can prevent the pits 221 from interfering with the imaging piece 40 obtaining a clear image.

When the light is emitted to the finger 70 on the finger plate 10 from the first surface 21, since prints on the finger 70 have high-low structural differences of valleys and ridges, light scattering occurs when the light is at the ridge to form a dark region, and light reflection occurs when the light is at the valley to form a bright region. In other words, when the light is irradiated on the finger 70, a stripe image having light and dark contrasts is formed, and the stripe image is the fingerprint image. The lens 42 receives the stripe image having the bright and dark contrasts generated when the light is irradiated on the finger 70, so that the sensor 44 recognizes and interprets the fingerprint image.

Moreover, the fingerprint recognition device 99 in this embodiment may further comprise a microstructure 50. The microstructure 50 is disposed below the finger plate 10, so that the first surface 21 of the light guiding plate 20 faces the microstructure 50. The microstructure 50 provides a scattering effect as the light enters the finger plate 10, so the light emitted onto the whole surface of the finger plate 10 is even, and the light irradiated on the finger 70 is sufficiently.

Moreover, the fingerprint recognition device 99 in this embodiment may further comprise a reflection sheet 60. The reflection sheet 60 is disposed at one side of the light guiding plate 20 and corresponds to the second surface 22, and a distance is kept between the reflection sheet 60 and the second surface 22. The reflection sheet 60 has a first through hole 61, and the imaging piece 40 is located in the first through hole 61. The reflection sheet 60 is used for reflecting the light emitted from the second surface 22 into the light guiding plate 20, so as to reduce the light energy loss and increase the brightness of the light emitted from the first surface 21 to make the light irradiated to the finger 70 more sufficient.

The light source 30 in this embodiment is disposed at the sidewall surface 23 of the light guiding plate 20, so the thickness of the fingerprint recognition device 99 is not increased because of the light source 30. Therefore, the fingerprint recognition device 99 in this embodiment may be thinner and also enables a portable electronic device to become thinner. Moreover, the way of the light source 30 irradiating at the side of the light guiding plate 20 forms an effect of the surface light source, which not only solves the bright point problem but also reduces the number of the light sources 30 to improve the quality of fingerprint contrast.

Figure 3:
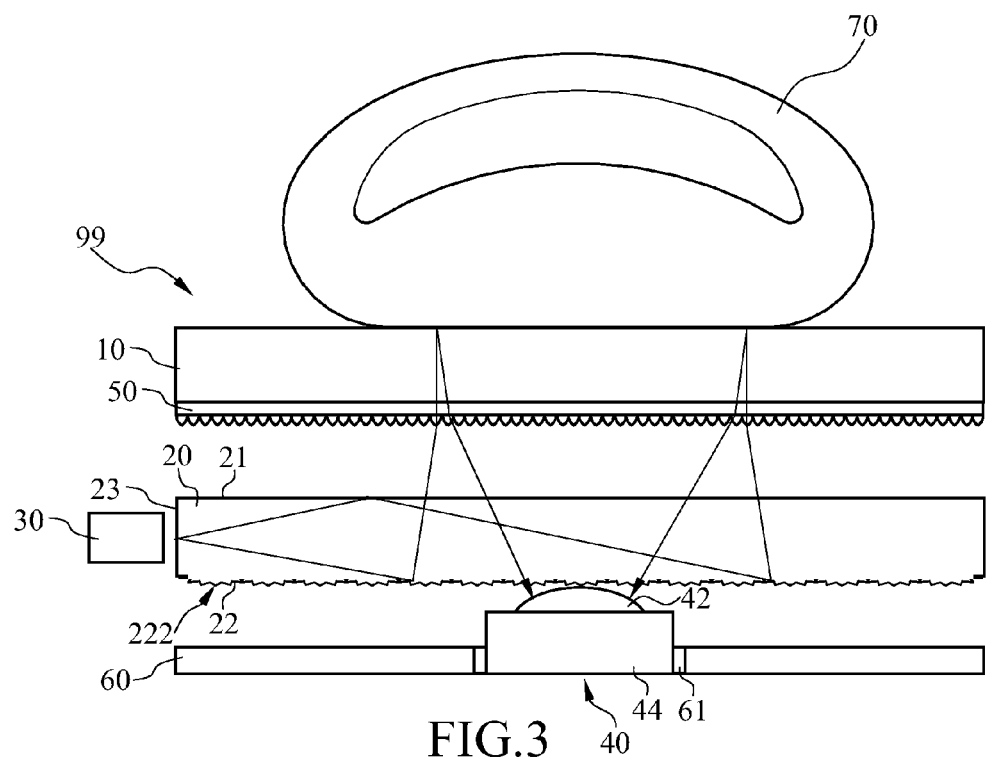
FIG. 3 is a structural sectional view of a fingerprint recognition device according to another embodiment.

FIG. 3 is a structural sectional view of a fingerprint recognition device according to another embodiment. This embodiment is similar to the structure in the embodiment in FIG. 1A, so the same parts are not described again.

Referring to FIG. 3, the light guiding plate 20 in this embodiment is a transparent sheet. The material of the light guiding plate 20 may be glass, PMMA, or PC, but the present disclosure is not limited thereto. The light guiding plate 20 has a first surface 21, a second surface 22, and at least one sidewall surface 23. The first surface 21 and the second surface 22 are located at two opposite sides of the light guiding plate 20 respectively, and the sidewall surface 23 is connected between the first surface 21 and the second surface 22. Moreover, the second surface 22 has a scattering structure. In this embodiment, the scattering structure is an irregular structure formed by a number of tiny concave and convex microstructures 222, which enable the second surface 22 to form an irregular plane. The light source 30 emits a light towards the sidewall surface 23 and the light enters the light guiding plate 20. The light inside the light guiding plate 20 is scattered by the tiny concave and convex microstructures 222 on the second surface 22 and is emitted out of the light guiding plate 20 from the first surface 21 to the finger plate 10.

Figure 4:
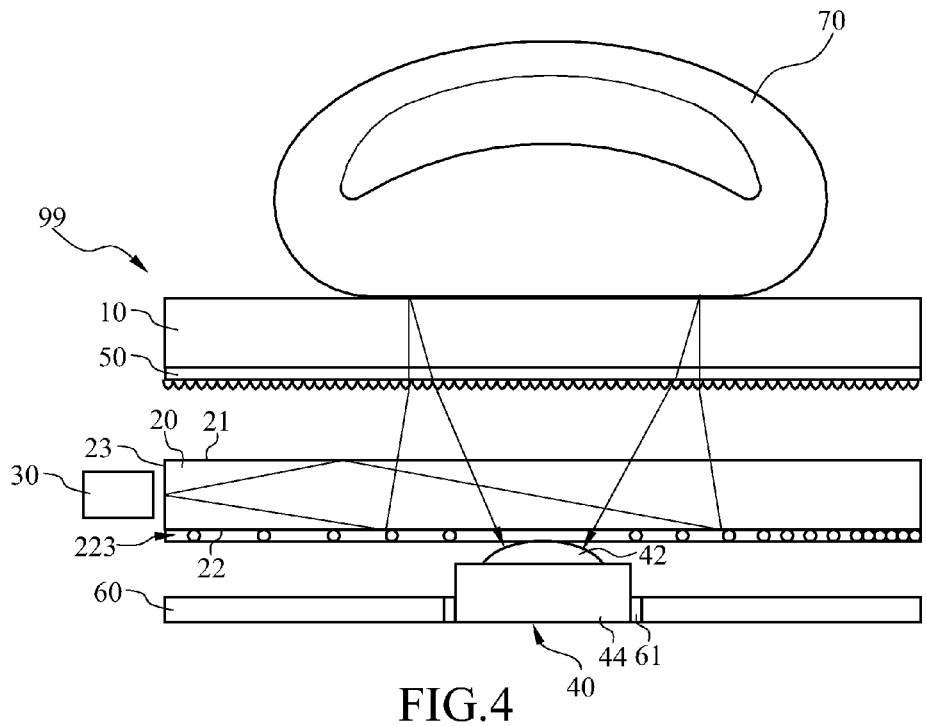
FIG. 4 is a structural sectional view of a fingerprint recognition device according to another embodiment.

FIG. 4 is a structural sectional view of a fingerprint recognition device according to another embodiment. This embodiment is similar to the embodiment structure in FIG. 1A, so the same parts are not described again.

Referring to FIG. 4, the light guiding plate 20 in this embodiment is a transparent sheet. The material of the light guiding plate 20 may be glass, PMMA, or PC, but the present disclosure is not limited thereto. The light guiding plate 20 has a first surface 21, a second surface 22, and at least one sidewall surface 23. The first surface 21 and the second surface 22 are located at two opposite sides of the light guiding plate 20 respectively, and the sidewall surface 23 is connected between the first surface 21 and the second surface 22. Moreover, the second surface 22 has a scattering structure. In this embodiment, the scattering structure is a diffusion layer 223 having a number of granules, and the diffusion layer 223 is disposed on the second surface 22. The light source 30 emits a light towards the sidewall surface 23 and the light enters light guiding plate 20. The light through the light guiding plate 20 is scattered by the granules inside the diffusion layer 223 on the second surface 22, then the light is emitted from the first surface 21 and is irradiated to the finger plate 10.

In addition, in the above embodiments, the reflection structure or the scattering structure is a structure body having a concave or convex shape to reflect or scatter the light, but the characteristics are not intended to limit the fingerprint recognition device 99. In another embodiment, the scattering structure may also be a number of tiny optical ink points, which are formed on the second surface 22 in a printing manner. The light in the light guiding plate 20 is scattered by the optical ink points on the second surface 22, then the light is emitted out of light guiding plate 20 from the first surface 21 and is irradiated to the finger plate 10.

Figure 5:
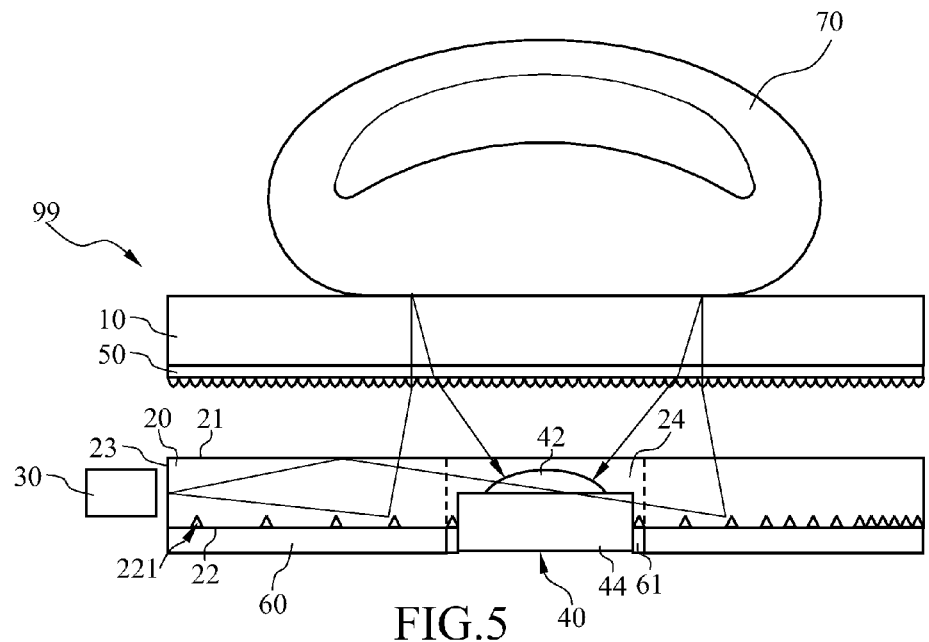
FIG. 5 is a structural sectional view of a fingerprint recognition device according to another embodiment.

FIG. 5 is a structural sectional view of a fingerprint recognition device according to another embodiment. This embodiment is similar to the structure in the embodiment in FIG. 1A, so the same parts are not described again.

Referring to FIG. 5, the light guiding plate 20 in this embodiment further has a second through hole 24. The second through hole 24 penetrates the light guiding plate 20 from the first surface 21 to the second surface 22. The position of the second through hole 24 corresponds to the position of the first through hole 61 of the reflection sheet 60. Furthermore, the second through hole 24 and the first through hole 61 are overlapped with each other, and the imaging piece 40 is located in both the first through hole 61 and the second through hole 24. Moreover, the reflection sheet 60 is adhered on the second surface 22 of the light guiding plate 20. In this way, the fingerprint recognition device 99 may have a smaller thickness. Similarly, the characteristic that the reflection sheet 60 adhered on the second surface 22 of the light guiding plate 20 may also be applied to the embodiments in FIG. 3 and FIG. 4.

Through the fingerprint recognition device according to the embodiments, the light source is disposed at the sidewall surface of the light guiding plate, so that the thickness of the fingerprint recognition device is not increased because of the light source. Moreover, the finger plate and the reflection sheet are adhered on the first surface and the second surface of the light guiding plate respectively, so that the fingerprint recognition device obtains a design of thinner structure. Furthermore, the light source emits at the side of the light guiding plate to form an effect of the evenly distributed surface light source, which not only solves the bright point problem but also reduces the number of the light sources to improve the quality of fingerprint contrast.

What is claimed is:

1. A fingerprint recognition device, applicable to retrieving a fingerprint image of a finger, comprising:
    a light guiding plate, having a first surface, a second surface, and at least one sidewall surface, wherein the first surface and the second surface are located at two opposite sides of the light guiding plate respectively, and the sidewall surface is connected between the first surface and the second surface, wherein the first surface is parallel to the second surface;
    a finger plate, disposed on the light guiding plate, wherein the first surface of the light guiding plate faces the finger plate and is separated from the finger plate by a distance;
    an imaging piece, adjacent to the second surface of the light guiding plate; and
    at least one light source, facing the sidewall surface of the light guiding plate, wherein the light source emits a light towards the sidewall surface and the light enters the light guiding plate, the light guided by the light guiding plate is emitted out of the first surface, so as to form a back light source of the finger plate, and the imaging piece retrieves the fingerprint image of the finger on the finger plate.

2. The fingerprint recognition device according to claim 1, wherein the second surface of the light guiding plate further has a reflection structure, and an arrangement position of the reflection structure in the light guiding plate and an image retrieving position of the imaging piece facing the light guiding plate are misaligned with each other.

3. The fingerprint recognition device according to claim 2, wherein a distribution density of the reflection structure in an area far away from the light source is greater than a distribution density of the reflection structure in an area adjacent to the light source.

4. The fingerprint recognition device according to claim 1, wherein the second surface of the light guiding plate further has a scattering structure, and an arrangement position of the scattering structure in the light guiding plate and an image retrieving position of the imaging piece facing the light guiding plate are misaligned with each other.

5. The fingerprint recognition device according to claim 4, wherein a distribution density of the scattering structure in an area far away from the light source is greater than a distribution density of the scattering structure in an area adjacent to the light source.

6. The fingerprint recognition device according to claim 1, further comprising a microstructure, disposed and combined below the finger plate.

7. The fingerprint recognition device according to claim 1, further comprising a reflection sheet, disposed at one side of the light guiding plate and corresponding to the second surface, wherein the reflection sheet has a first through hole, and the imaging piece is located in the first through hole.

8. The fingerprint recognition device according to claim 7, wherein the light guiding plate has a second through hole corresponding to the first through hole, and the imaging piece is located in the first through hole and the second through hole at the same time.

9. The fingerprint recognition device according to claim 7, wherein the reflection sheet contacts the second surface of the light guiding plate.

10. The fingerprint recognition device according to claim 1, wherein the finger plate further has a microstructure and the first surface of the light guiding plate faces the microstructure.

\* \* \* \* \*